73-290 SR
11/29/77 XR 4,059,904

United States Patent [19]

[11] 4,059,904

[45] Nov. 29, 1977

Sato

[54] PREPARATION OF COATING COMPOSITION OF SPECIFIED COLOR

[75] Inventor: Hidetaka Sato, Amagasaki, Japan

[73] Assignee: Kansai Paint Company, Ltd., Amagasaki, Japan

[21] Appl. No.: 555,278

[22] Filed: Mar. 4, 1975

[51] Int. Cl.$^2$ .................... G01F 23/04

[52] U.S. Cl. .................... 33/126.7 A; 73/296

[58] Field of Search .......... 33/126.5, 126.6, 126.7 R, 33/126.7 A; 73/322, 290

[56] References Cited

U.S. PATENT DOCUMENTS

| | | | |
|---|---|---|---|
| 1,199,103 | 9/1916 | Newmayer | 33/126.7 R |
| 3,782,599 | 1/1974 | Luginbuhl | 73/322 |

FOREIGN PATENT DOCUMENTS

| | | | |
|---|---|---|---|
| 675,267 | 1966 | Belgium | 33/126.7 A |
| 870,801 | 6/1961 | United Kingdom | 33/126.7 A |

*Primary Examiner*—Richard E. Aegerter
*Assistant Examiner*—John W. Shepperd
*Attorney, Agent, or Firm*—Larson, Taylor and Hinds

[57] ABSTRACT

A card for measuring off colored base coating compositions comprising a scale indicating the volumes of solvent and colored base coating compositions; an apparatus for measuring off colored base coating compositions comprising said card, a pointer, a probe member and a container for receiving solvent and colored base coating compositions; and a method of measuring off colored base coating compositions using said apparatus.

2 Claims, 5 Drawing Figures

PREPARATION OF COATING COMPOSITION OF SPECIFIED COLOR

This invention relates to the preparation of coating compositions of specified colours, and more particularly to a novel and improved card for measuring off coloured base coating compositions, a novel and improved apparatus for measuring off specified volumes of coloured base coating compositions employing said card and a method of measuring off specified volumes of coloured base coating compositions using said apparatus.

Coating compositions of specified colours are widely used in various industries. It is already known, for example in repair finishing of motor cars, electric cars, etc., to prepare a coating composition of a specified colour by measuring off specified amounts of coloured base coating compositions and mixing them together.

Coloured base coating compositions for the preparation of a coating composition of the specified colour are usually measured off by a measuring apparatus equipped with a card marked with graduation lines indicating the specified volumes of the base coating compositions, a pointer movable in a predetermined direction, a probe member vertically movable with the pointer in a constant ratio of movement thereto, and a container placed in position and having predetermined inner diameter and depth, namely a predetermined volume, for receiving the coloured base coating compositions. The card on the measuring apparatus is in such position that the pointer is settable to the graduation lines, whilst the container is so positioned as to permit the probe member to move thereinto. The probe member is positioned on the inner bottom surface of the container when the pointer is set to the zero line of the scale on the card. After the probe member is brought to a specified position within the container by the setting of the pointer to a first graduation line for a coloured base coating composition on the card, the base coating composition of predetermined colour is poured into the container on the apparatus until the liquid level of the composition reaches the probe member, whereupon the pouring is discontinued. The arrival of the liquid level to the probe member is detected by the contact of surface of the composition with the probe member as ascertained with the unaided eye. Thus the first base coating composition is measured off. Subsequently, the pointer is set to a second graduation line on the card to shift the probe member upward within the container. The next coloured base coating composition is thereafter measured off in the same manner as above. Such measuring procedure is followed for each of the coloured base coating compositions to be used for the preparation of coating composition of the desired colour. The base coating composition in the measured volumes are then mixed together to obtain a coating composition of the specified colour. To render the base compositions easily mixable, a solvent may be used when mixing them together.

Measuring apparatus of the type described are disclosed, for example, in the specification of Japanese patent publication No. 31086/1972 and German Pat. No. 1,236,218. When these known measuring apparatus are used for measuring off a coloured base coating composition, it depends solely on the determination with the unaided eye of the contact between the surface of base coating composition and the probe member to detect that the volume of the composition being placed into the container has reached a predetermined value. However, such visual determination is not easy since the rise or the change in the surface of the base coating composition caused upon contact between the base coating composition and the probe member is not distinct due to high surface tension, high viscosity and high specific gravity of the base coating composition. It is therefore likely to involve marked measuring errors, making it difficult to formulate a coating composition of the desired colour.

Although it may be possible to accurately measure off a coloured base coating composition, for example, by an apparatus equipped with an electronical means, such apparatus will be extremely complicated and highly expensive and can be used only in a very limited field. Moreover, if such an electronical means is to be used, measuring apparatus of the conventional type as mentioned above shall be scrapped wastefully.

An object of this invention is, therefore, to eliminate the drawbacks of the prior art described above with a simple means.

Another object of this invention is to provide a novel and improved card for accurately measuring off specified volumes of coloured base coating compositions with the unaided eye, which can be used in a known measuring apparatus.

Still another object of this invention is to provide an apparatus having simple constructions for accurately measuring off specified volumes of coloured base coating compositions, using said novel card.

Still another object of this invention is to provide a method of accurately measuring off specified volumes of coloured base coating compositions, which makes it possible to prepare a coating composition having a colour as precise as is specified in a simple manner.

These and other objects and features of this invention will become more apparent from the following descriptions.

The card of the present invention for measuring off specified volumes of coloured base coating compositions to be formulated into a coating composition of a specified colour comprises a scale indicating the volumes of solvent and coloured base coating compositions required for the preparation of the coating composition of specified colour, the scale including a graduation line adjacent to a zero line and indicating the volume of the solvent and graduation lines subsequent to the graduation line to indicate the volumes of the coloured base coating compositions and arranged in the order of progressively decreasing volumes; an indication of the solvent provided adjacent to the graduation line for the solvent; and indications of the kinds of the coloured base coating compositions provided adjacent to the corresponding graduation lines for the coloured base coating compositions respectively.

The apparatus of this invention for measuring off coloured base coating compositions to be formulated into a coating composition of a specified colour includes the aforesaid novel card of this invention, a pointer, a probe member and a container which are the same as those employed in conventional measuring apparatus.

According to this invention, various coloured coating compositions are usable as the base coating compositions to be formulated into a coating composition of the desired colour, insofar as they are miscible with one another.

Various solvents can be used in the present invention for accurately measuring off the volumes of coloured base coating composition, insofar as they are miscible with the base coating composition. When coloured base coating compositions of organic solvent type are to be measured off, for example, organic solvents as follows can be used alone or in combination of at least two kinds:

(1) petroleum hydrocarbons such as mineral spirit, V.N. & P.-naphtha, toluene, xylene, etc., (2) alcohols such as ethanol, n-propanol, iso-propanol, amylalcohol, ethyleneglycol, propyleneglycol, etc., (3) nitro-hydrocarbons such as nitro-paraffin, nitro-propane, etc., (4) ketones such as acetone, methyl ethyl ketone, methyl butyl ketone, methyl propyl ketone, methyl amyl ketone, cyclohexanone, isophorone, diacetone alcohol, etc., (5) ethers such as ethyl ether, iso-propyl ether, ethylene glycol monomethyl ether, ethylene glycol monoethyl ether, ethylene glycol monophenyl ether, diethylene glycol monomethyl ether, diethylene glycol monoethyl ether, diethylene glycol monobutyl ether, etc., (6) esters such as ethyl acetate, iso-propyl acetate, n-propyl acetate, iso-butyl acetate, n-butyl acetate, amyl acetate, 2-ethylhexyl acetate, cyclohexyl acetate, ethylene glycol monomethyl ether acetate, ethylene glycol monoethyl ether acetate, ethyl butyrate, etc., (7) furans such as furfuryl alcohol, tetrahydrofuran, tetrahydrofurfuryl alcohol, etc. When coloured base coating compositions of aqueous solution type are to be measured off, for example water or a mixture of water with at least one of the following solvents can be used:

(1) alcohols such as methanol, ethanol, ethylene glycol, diethylene glycol, etc., (2) cellosolves such as methyl cellosolve, butyl cellosolve etc., (3) ketones such as acetone, methyl ethyl ketone, etc., (4) furans such as furfuryl alcohol, etc., (5) dioxane, etc. When coloured base coating compositions of emulsion type are to be measured off, water is used.

The card of this invention is marked with graduation lines indicating the volumes of coloured base coating compositions as well as with a graduation line indicating the volume of solvent. The solvent volume indicating line is arranged subsequent to the zero line. When coloured base coating compositions are to be measured off with a measuring apparatus equipped with the card of this invention, the pointer is first set to the solvent graduation line on the card, whereby the probe member is brought to a specified position within the container on the measuring apparatus. The solvent is then poured into the container on the apparatus until it is ascertained with the unaided eye that the liquid level or surface of the solvent has contacted the probe member. In this way it is detected that the prescribed volume of solvent has been poured into the container, whereupon pouring of the solvent is discontinued. Thus the predetermined amount of solvent can be measured off. To ensure accurate measurement of the volume of solvent, it is preferable to slowly pour the solvent into the container and to thereby keep the liquid level smooth, for example, by pouring the solvent in small amounts while causing the solvent to flow down along the inner wall surface of the container.

The moment when the solvent comes into contact with the probe member within the container in the measurement of volume of the solvent, the portion of the solvent surface under the probe member coming into contact with the lower end of the probe member quickly rises as if jumping up due to the surface tension, viscosity and specific gravity of the solvent. The quick rise of the solvent, which can be clearly confirmed with the unaided eye with ease, makes it possible to accurately measure out the specified volume of solvent and, accordingly, to measure off the coloured base coating compositions with accuracy as will be apparent from the following description.

The card of this invention is marked with graduation lines indicating the volumes of coloured base coating compositions which lines are arranged subsequent to the graduation line for the solvent. With the measuring apparatus of this invention, therefore, measurement of solvent is followed by the procedure of measuring off the coloured base coating composition. Every time each of the coloured base coating compositions is to be measured off, the probe member in the container on the measuring apparatus is shifted by the setting of the pointer to the corresponding graduation line for the particular base composition. The coloured base coating composition is poured into the container on the apparatus.

While the coloured base coating composition is being poured into the container, the solvent placed in the container is measured out progressively moves upward to above the base coating composition being poured into the container due to the difference in specific gravity, with the result that the surface of the solvent gradually comes into contact with the probe member placed in a specified position within the container when the volume of the coloured base coating composition has reached a specified value. This contact is confirmed with the unaided eye to measure out the coloured base coating composition.

The contact of solvent with the probe member can be visually confirmed much more easily than the direct contact of coloured base coating composition with the probe member, because solvent which is considerably lower than coloured base coating compositions in surface tension, specific gravity and viscosity rises in jumping fashion upon contact with the probe member more quickly and more markedly than when base coating compositions rise upon contact with the probe member. Thus the rise of solvent is ascertainable much more distinctly than that of base coating composition. Thus coloured base coating compositions can be accurately measured out by visually confirming the contact of solvent with the probe member according to this invention, and coating compositions of the desired colour are made available. When the card of this invention is provided with a solvent graduation line, the distances of the graduation lines for the coloured base coating compositions from the zero line are of course larger by a distance between the solvent graduation line and the zero line than when the solvent graduation line is not provided. The distance between the solvent line and the zero line is not critical and may be suitably determined. In order to accurately measuring off coloured base coating compositions, it is preferable to slowly pour the base coating compositions into the container so as not to fret the surface of the measured-off solvent in the container.

If the solvent placed in the container is retained in or mixed with the layer of coloured base coating composition within the container, it becomes thereafter difficult or impossible to accurately measure out coloured base coating compositions. This problem can be eliminated by replenishing the container with an amount of solvent, which will then be present in the container as the uppermost layer. For this procedure, the probe matter is temporarily brought out of operative relation with the pointer. With the pointer left in position, the probe member is shifted to a suitable level within the container, and the solvent is placed thereinto up to that level. The probe member is then associated with the pointer again for the subsequent procedure of measuring off coloured base coating compositions.

Alternatively, the above problem can be overcome by the use of a card having a scale in which at least one additional graduation line for the solvent is provided between the graduation lines for the first and last coloured base coating compositions on the card described above. With the card of the second-mentioned type, the distances between the zero line and the base composition graduation line subsequent to the additional solvent graduation line and the following base composition graduation lines are larger by a distance between the additional solvent graduation line and the base composition graduation line immediately preceding that solvent line.

When coloured base coating compositions are measured out by a method employing a measuring apparatus as described above, the coloured base coating composition is poured into a container positioned on the apparatus. At this time, the base coating composition continuously flows down preferably in the form of a thread until the solvent, which is being placed into the measuring container, comes into contact with the probe member within the measuring container. Consequently, the thread-like downflow of the coloured base coating composition still exists in the measuring container even at the moment when the volume of the pour-in coloured base coating composition has reached a predetermined value. Thus even if the pouring of the coloured base coating composition is stopped at that moment, the downflow portion of the coloured base coating composition is eventually added to the predetermined volume as an excess. It is desirable to minimize this excess to the greatest possible extent in order to prepare a coating composition having a colour as precise as is specified.

Because the graduation lines for coloured base coating compositions on the card of this invention are arranged in the order of progressively decreasing volumes of the base compositions, the base compositions are measured off in the same order. It therefore follows that the smaller the predetermined volume of coloured base coating composition, the smaller is the excess. Whereas such excess exerts a relatively great influence on the coloured base coating composition to be used in a small amount, the present invention has the advantage that insofar as the measuring container used is not excessively deep, the volume of such coloured base coating composition can be determined accurately to substantially avoid an adverse effect which would otherwise result from excess use. Furthermore this is effective in ensuring accurate visual determination of the volume of coloured base coating composition utilizing the rise of liquid level of solvent as already described.

The card of this invention, with the foregoing features, is especially suitable for use in preparing coating compositions in relatively small volumes such as 4 liters, one liter, ½ liter, ¼ liter, etc.

When desired, the card of this invention may have at least two different volume scales for the materials (i.e. solvent and coloured base coating compositions) for preparing coating compositions of the same colour.

Where desired, the card of this invention may further include a colour identifying portion showing the colour of coating which is given by the coating composition prepared from the predetermined volumes of solvent and coloured base coating compositions. The colour identifying portion has an end in line-to-line coincidence with at least one part of edge of the card. The term "edge of the card" as used herein and in the appended claims includes an outer edge of the card as well as an edge defining an aperture or a cutout when such aperture or cutout is formed in the card.

The card of this invention which is provided with such additional means is especially suitable when preparing a coating composition for repair finishing of a motor vehicle or the like, since the colour of the coating to be formed from the coating composition can be readily and accurately matched with the colour of the coating to be repaired. Thus the card makes it easy to prepare a coating composition which gives the colour matching with that of the coating to be repaired. When repairing a coated article, the card is placed on the article, with the colour identifying portion positioned as the front surface. In this position, the end of the identifying portion in line-to-line coincidence with the edge of the card defines a boundary between the identifying portion and the coating to be repaired, whereby the colour of the coating to be formed from a particular coating composition can be compared with the colour of the latter coating for colour matching, without any intervening blank therebetween. In this way, colour matching can be conducted readily to determine a coating composition which will give the colour matching with the colour of the coating to be repaired, this making it easy to prepare the desired coating composition.

The card of this invention is provided with an indication of solvent adjacent to the graduation line for the solvent and indications of coloured base coating compositions adjacent to the corresponding graduation lines respectively so as to ensure that correct coloured base coating compositions and solvent will be measured as indicated. The indications of the solvent and the kinds of the coloured base coating compositions are given by symbols and/or characters.

Specified amounts of coloured base coating compositions measured off according to this invention are then mixed together to prepare a coating composition of a colour as precise as is specified.

A preferred embodiment of the card of this invention and an apparatus for using the card will be described below with reference to the accompanying drawings, in which.

Figure 1:
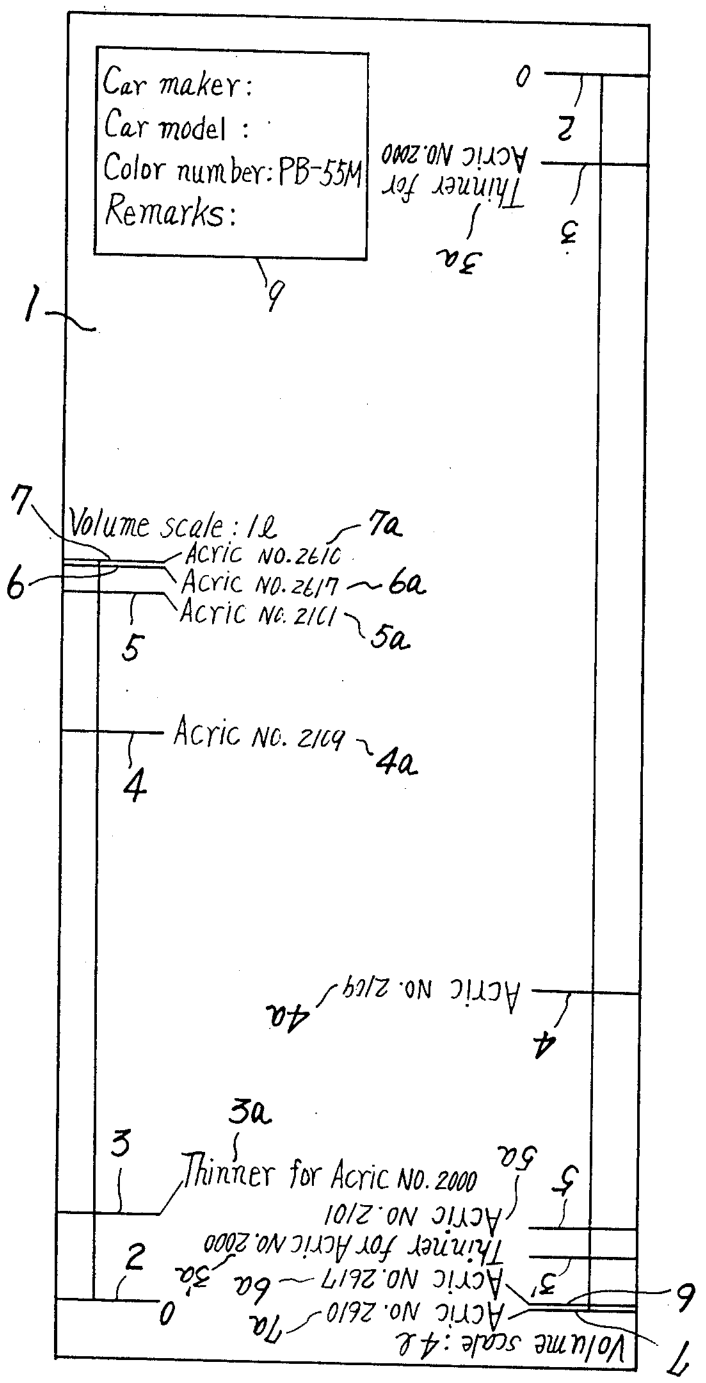
FIG. 1 is a front view showing a preferred embodiment of the card of this invention.
Figure 2:
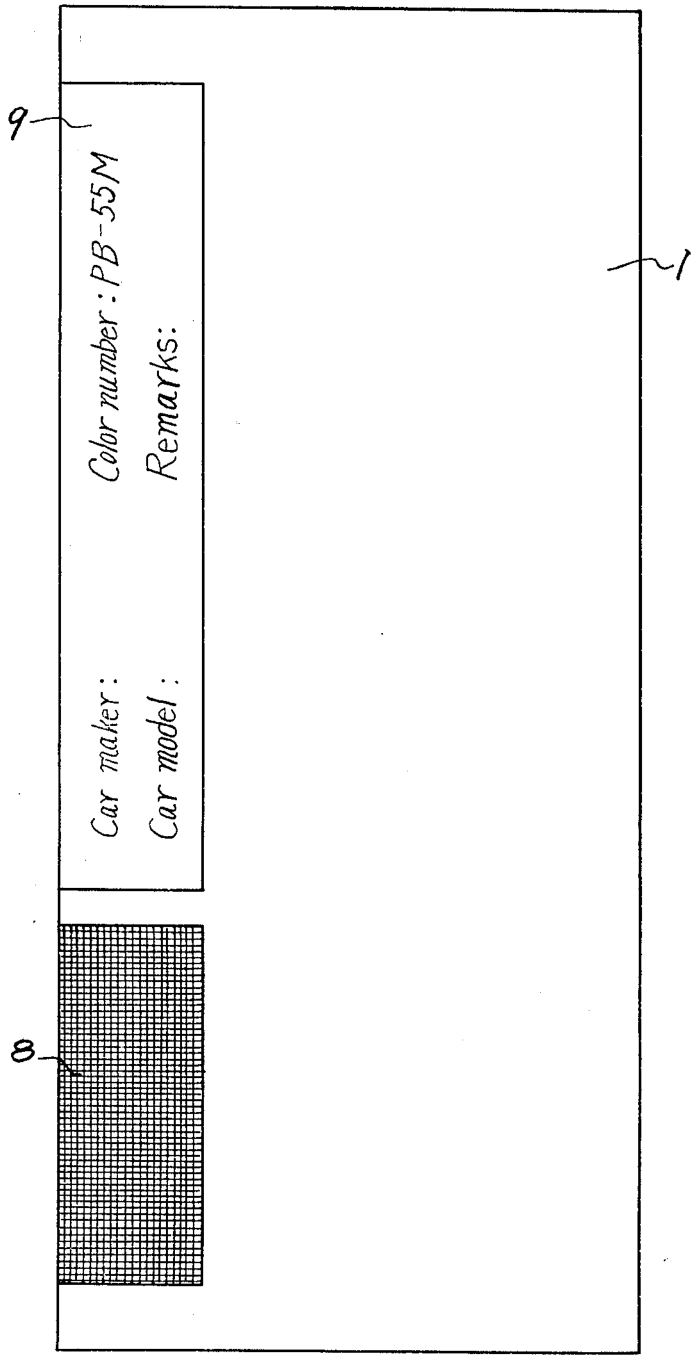
FIG. 2 is a rear view of the embodiment.

FIGS. 1 and 2 show a card 1 of this invention for measuring off a coating composition of a specified colour. The card 1 is marked, on the front surface and along a longitudinal edge thereof, with a zero line 2, a graduation line 3 indicating the volume of solvent (e.g. thinner) and positioned adjacent to the zero line 2, and graduation lines 4, 5, 6 and 7 subsequent to the graduation line 3 to indicate the volumes of coloured base coating compositions and arranged in the order of progressively decreasing volumes. An indication 3*a* of the solvent (thinner) is provided adjacent to the graduation line 3. Indications 4*a*, 5*a*, 6*a*, and 7*a* of the kinds of the coloured base coating compositions are provided adjacent to the corresponding graduation lines 4, 5, 6 and 7. Like graduation lines and like indications are provided for another volume scale along the other longitudinal edge of the card 1 shown in FIG. 1. Alternatively one volume scale is provided on one surface of the card and another volume scale, on the other surface. When desired, the card may be marked with only one volume scale or more than two volume scales. The scale on one side is for the preparation of 4 liters of composition, and the scale on the other side for 1 liter. The scale for 4 liters includes, in addition to the solvent line 3 adjacent to the zero line 2, another graduation line 3' indicating an additional volume of solvent and interposed between the graduation lines 5 and 6 for coloured base coating composition. The graduation line 3' is provided with an indication 3'*a* for the solvent.

The card 1 further has a colour identifying portion 8 on the rear surface thereof (illustrated as a checkerboarded portion) showing the colour of coating given by the coating composition prepared from the indicated volumes of the solvent and the coloured base coating compositions. The colour identifying portion 8 may be provided on the front surface of the card 1, when desired. The colour identifying portion 8 has an end in line-to-line coincidence with at least one part of edge of the card 1. In the illustrated embodiment, the end of the colour identifying portion 8 is in alignment with one side edge of the card 1. Alternatively, the colour identifying portion 8 may be positioned away from the side edges of the card 1, and the colour identifying portion 8 is formed with an aperture, or an edge of the card 1 is cut out to form a cutout in the colour identifying portion 8, so that the aperture or cutout renders an end of the colour identifying portion 8 coincident with an edge of the card in line-to-line relation thereto. The term "Acric No." shown on the card 1 represents the colour number in Color Sample Note for coloured base coating compositions of No. 2000 series identified by the trade mark "Acric" (product of Kansai Paint Company, Limited, Japan). The coating composition prepared from a mixture of the measured amounts of the coloured base coating compositions and solvent in accordance with the scale on the card 1 shown gives a colour corresponding to colour number "PB-55M" in the Color Sample Note referred to above.

The illustrated embodiment is adapted for use in preparing a coating composition for repair finishing of a motor vehicle. The card 1 therefore bears a table 9 showing car maker, car model, colour number and other remarks necessary for the repair of coating.

The card of this invention may further be provided with a different kind of scale which is arranged, for example, in opposing relation to the foregoing scale or which is marked off on the opposite surface thereto. This scale is used for the preparation of another coating composition, having the same specified colour as the above-described coating composition, from a solvent and coloured base coating compositions of different kinds from those indicated by the foregoing scale. Thus the scale indicates the volumes of the different kinds of solvent and coloured base coating compositions to be used. The scale includes a graduation line adjacent to a zero line and indicating the volume of the solvent, and graduation lines arranged subsequent to the solvent graduation line and indicating the volumes of the coloured base coating compositions, the graduation lines for the base compositions being arranged in the order of progressively decreasing volumes. The card having the different kind of scale is marked with an indication of solvent which is disposed adjacent to the solvent graduation line and with indications of the different kinds of coloured base coating compositions which are positioned adjacent to the corresponding graduation lines for the base compositions respectively.

Figure 3:
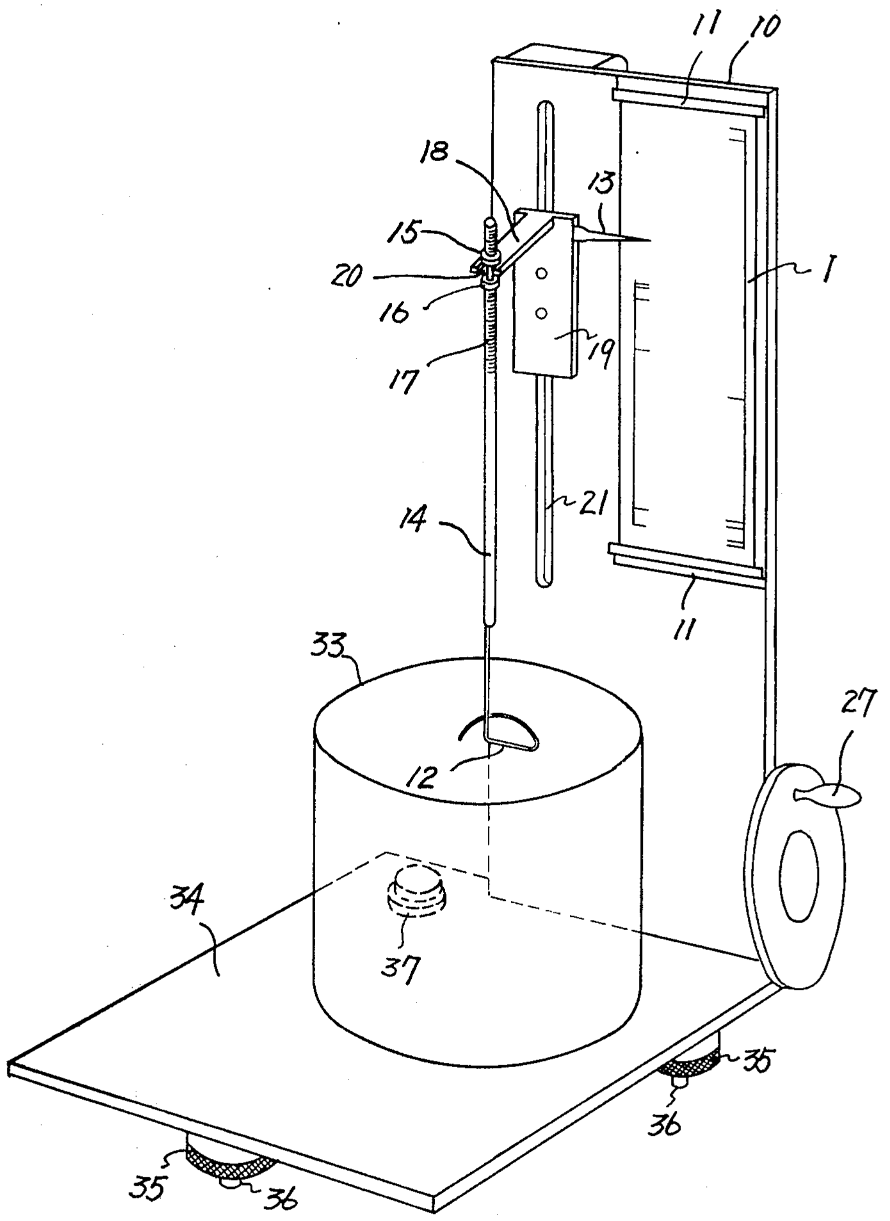
FIG. 3 is a perspective view showing an apparatus for using the card shown in FIGS. 1 and 2.
Figure 4:
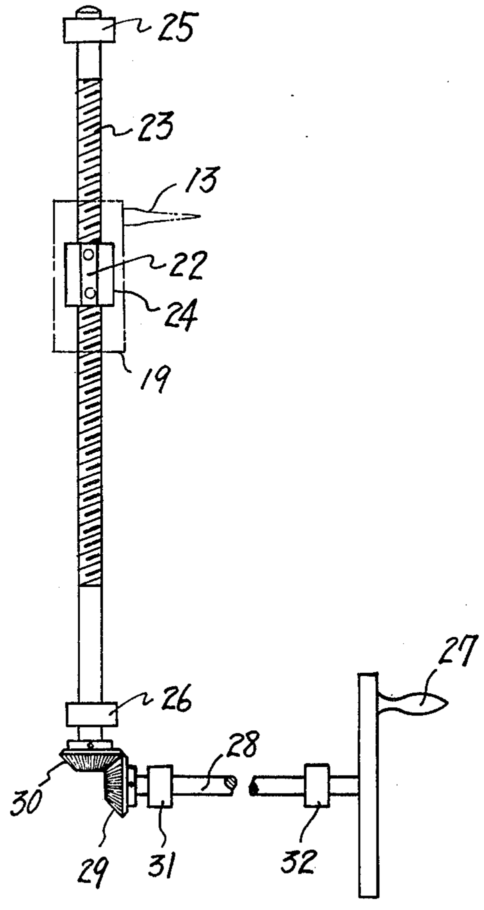
FIG. 4 is a front view partly omitted and showing a feed screw system included in the apparatus for a probe member and a pointer.
Figure 5:
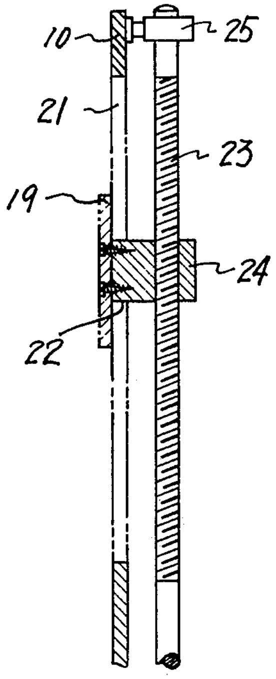
FIG. 5 is a fragmentary side elevation showing the system of FIG. 4.

FIGS. 3 to 5 shows an embodiment of the measuring apparatus of this invention equipped with the card 1. The card 1 is placed in a specified position on the front surface of a stand 10 by being removably inserted, for example, between vertically opposed L-shaped members 11 and 11.

The measuring apparatus includes a container 33 and a probe member 12 fixed to the lower end of a support rod 14, the upper end of which has a male screw portion 17. The probe member to be used in this invention need only be such that the contact of solvent with the lower end of the probe member positioned within the container is visually ascertainable from outside the container. Examples are a vertically positioned narrow plate, a horizontally positioned plate, a wire or slender bar, and a wire or bar having a horizontally looped lower end. A pointer 13 is fixed to a support frame 19 which is integral with a bracket 18. The distal end of the bracket 18 has a cutout 20, through which extends the male screw portion 17 of the support rod 14. The rod 14 is secured to the bracket 18 with nuts 15 and 16. The position of the probe member 12 relative to the pointer 13 can be altered by loosening the nuts 15, 16, vertically shifting the support rod 14 and then fastening the nuts 15, 16 again. The support frame 19 is fixedly mounted on the front surface of a slide shoe 22 slidably fitted in a vertically elongated slit 21 formed in the stand 10 (see FIGS. 4 and 5). The slide shoe 22 is joined to a nut 24 screwed on a feed screw 23 extending vertically on the rear side of the stand 10. The feed screw 23 is supported by bearings 25 and 26 fixed to the rear surface of the stand 10. A gear 30 fixedly mounted on the lower end of the feed screw 23 meshes with a gear 29 fixed to the front end of a rod 28 to be driven by a handle 27. The rod 28 is supported by bearings 31 and 32 secured to the rear surface of the stand 10.

The container 33 is placed on the planar upper surface of a base 34 on which the stand 10 is fixedly mounted. The base 34 has three legs 36 disposed in a triangular arrangement and equipped with adjusting means 35 for positioning the base 34 correctly in horizontal state. (FIG. 3 shows only two legs 36.) The base 34 is further provided with a level 37.

When the rod 28 is rotated by the handle 27, the feed screw 23 is driven by means of gears 29 and 30. The feed screw 23 thus driven causes the nut 24 to move the slide shoe 22 along the slit 21, moving the pointer 13 together with the support frame 19. At the same time, the probe member 12 is shifted within the container 31 by the support frame 19 through the bracket 18 and support rod 14.

Solvent and coloured base coating compositions are measured out with the illustrated apparatus in the same manner as already described.

The measuring apparatus of this invention shown in the drawings is given merely as one of the preferred embodiments and is not limitative in any way, but various modifications and alterations can be made. For example, the card 1 can be placed on the stand 10 in horizontal position, with the lines 2 to 7 positioned in a direction at right angles to that shown in FIG. 3. When the card 1 is used in such position, the pointer 13 must be rendered horizontally movable. These changes or modifications are obvious to one skilled in the art and are not shown therefore.

What is claimed is:

1. A method of measuring off specified volumes of coloured base coating compositions to be formulated into a coating composition of a specified colour which comprises the steps of:

a. removably inserting on a measuring apparatus a card for measuring off specified volumes of coloured base coating compositions which are to be formulated into a coating composition of a specified colour, wherein said card comprises a scale for indicating the volumes of solvent and coloured base, said scale containing a graduation adjacent to a zero line and indicating the volume of the solvent and graduation lines subsequent to the graduation line to indicate the volumes of coloured base coating compositions and arranged in order of progressively decreasing volumes, b. setting a pointer to the solvent graduation line on the card, whereby a probe member vertically movable with the pointer in a constant ratio of movement thereto is brought to a specified position within a container on the measuring apparatus, c. pouring the solvent into said container until it is ascertained with the unaided eyes that the surface of the solvent has contacted the probe member thereby forming a solvent layer d. progressively setting the pointer to the coloured base coating composition graduation lines, and e. measuring off specified volumes of coloured base coating compositions being poured into the container for measurement, in the order of progressively decreasing volumes of the base coating compositions by ascertaining with the unaided eyes that the surface of the solvent layer present above the base coating compositions has contacted the probe member.

2. A method as claimed in claim 1 which further comprises: ascertaining, after the addition of a coloured base coating composition to the container, when the solvent layer becomes mixed with a coloured base coating composition layer; moving the probe member independently of the pointer; and adding additional solvent to the container until the surface of the solvent contacts the base of the probe member thereby forming a new solvent layer.

* * * * *